Oct. 2, 1951     C. H. JOHNSON     2,569,526
HYDRAULIC FOLLOW-UP TOOL FEED FOR LATHES
Filed Oct. 29, 1945     7 Sheets-Sheet 1

Charles H. Johnson
INVENTOR.

BY
ATTORNEY

Oct. 2, 1951     C. H. JOHNSON     2,569,526
HYDRAULIC FOLLOW-UP TOOL FEED FOR LATHES
Filed Oct. 29, 1945     7 Sheets-Sheet 2

Charles H. Johnson
INVENTOR.

BY
ATTORNEY.

Oct. 2, 1951        C. H. JOHNSON        2,569,526

HYDRAULIC FOLLOW-UP TOOL FEED FOR LATHES

Filed Oct. 29, 1945        7 Sheets-Sheet 3

Charles H. Johnson
INVENTOR.

BY
ATTORNEY.

Oct. 2, 1951      C. H. JOHNSON      2,569,526

HYDRAULIC FOLLOW-UP TOOL FEED FOR LATHES

Filed Oct. 29, 1945      7 Sheets-Sheet 5

Charles H. Johnson
INVENTOR.

BY Elwin C. Andrus
ATTORNEY.

Oct. 2, 1951 C. H. JOHNSON 2,569,526
HYDRAULIC FOLLOW-UP TOOL FEED FOR LATHES
Filed Oct. 29, 1945 7 Sheets-Sheet 6

Charles H. Johnson
INVENTOR.

BY
ATTORNEY.

Oct. 2, 1951     C. H. JOHNSON     2,569,526
HYDRAULIC FOLLOW-UP TOOL FEED FOR LATHES
Filed Oct. 29, 1945     7 Sheets-Sheet 7

Charles H. Johnson
INVENTOR.

BY [signature]
ATTORNEY.

Patented Oct. 2, 1951

2,569,526

UNITED STATES PATENT OFFICE 2,569,526

HYDRAULIC FOLLOW-UP TOOL FEED FOR LATHES

Charles H. Johnson, Madison, Wis., assignor to Gisholt Machine Company, Madison, Wis., a corporation of Wisconsin Application October 29, 1945, Serial No. 625,233

10 Claims. (Cl. 29—42)

This invention relates to a hydraulic follow-up tool feed for lathes and constitutes an improvement upon the general type of hydraulic feed set forth in the application of Louis Godfriaux, Serial No. 608,985 filed August 4, 1945, for Tool Feed for Lathes, assigned to the assignee of the present application.

In the construction disclosed in said application the tool cross slide on the tool carriage of a lathe is operated by a servo-motor hydraulic power cylinder mounted on the carriage with its piston connected to a bracket on the slide and having a control valve mounted on the slide bracket with its plunger operated by a gear rack on the carriage. The rack is moved by a pinion driven by a shaft extending forward from a turret carriage and which is rocked by a gear segment operated by the vertical movement of a rack on the carriage in response to a cam as the turret carriage moves forward and back.

One of the objects of the present invention is to reduce the amount of turn of the rock shaft required for a given movement of the tool slide or the like.

Another object is to provide a tool feed mechanism less subject to wear and foreign dirt, and easier to adjust.

Another object is to more readily provide a wide range of speeds for traverse and feed purposes.

Another object is to increase the force ratio for control of the valve by the movement of the cam follower so that less force will be required at the cam for moving the valve plunger.

Another object is to reduce back lash to a minimum by changing from gears to a lever mechanism for operating the control valve.

Another object is to provide for more effectively holding the slide in retracted position by the power fluid.

Other objects will appear hereinafter in connection with the description of a preferred embodiment of the invention illustrated in the accompanying drawings.

Figure 1:
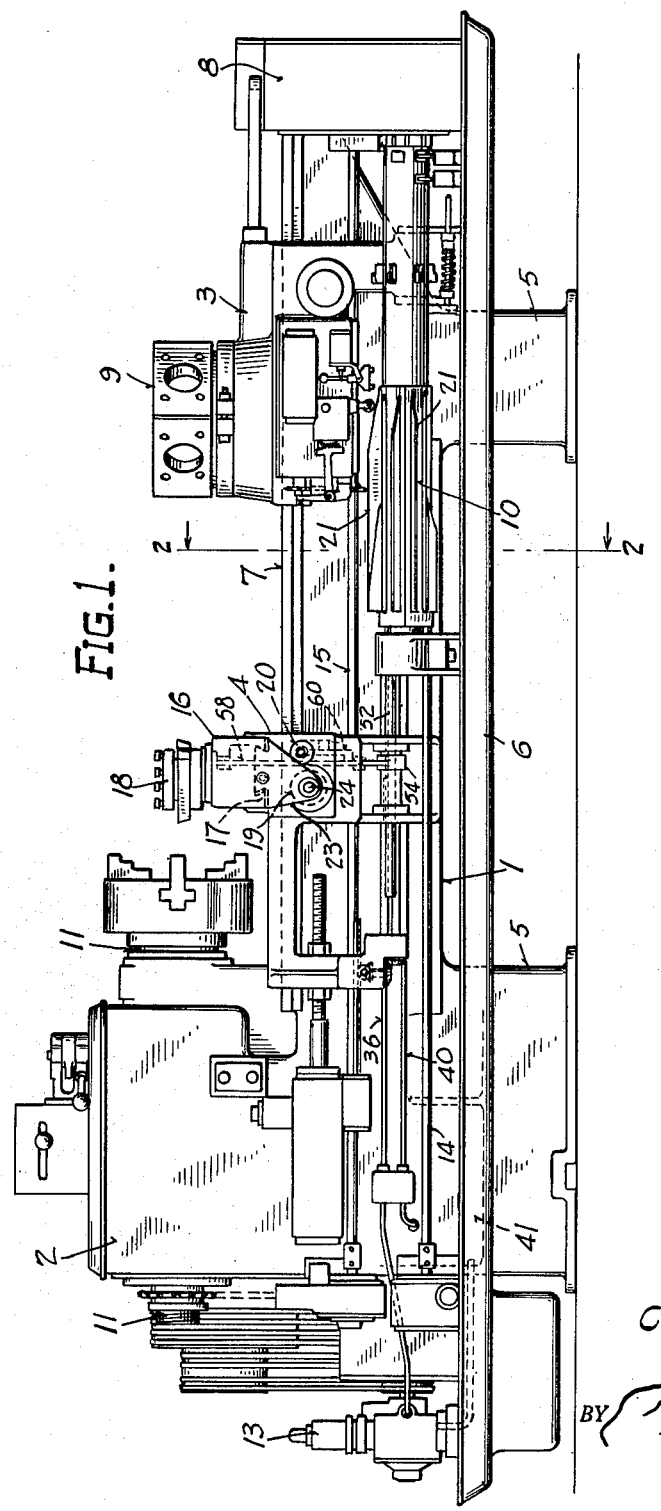
Figure 1 is a front elevation of a turret lathe embodying the invention.
Figure 2:
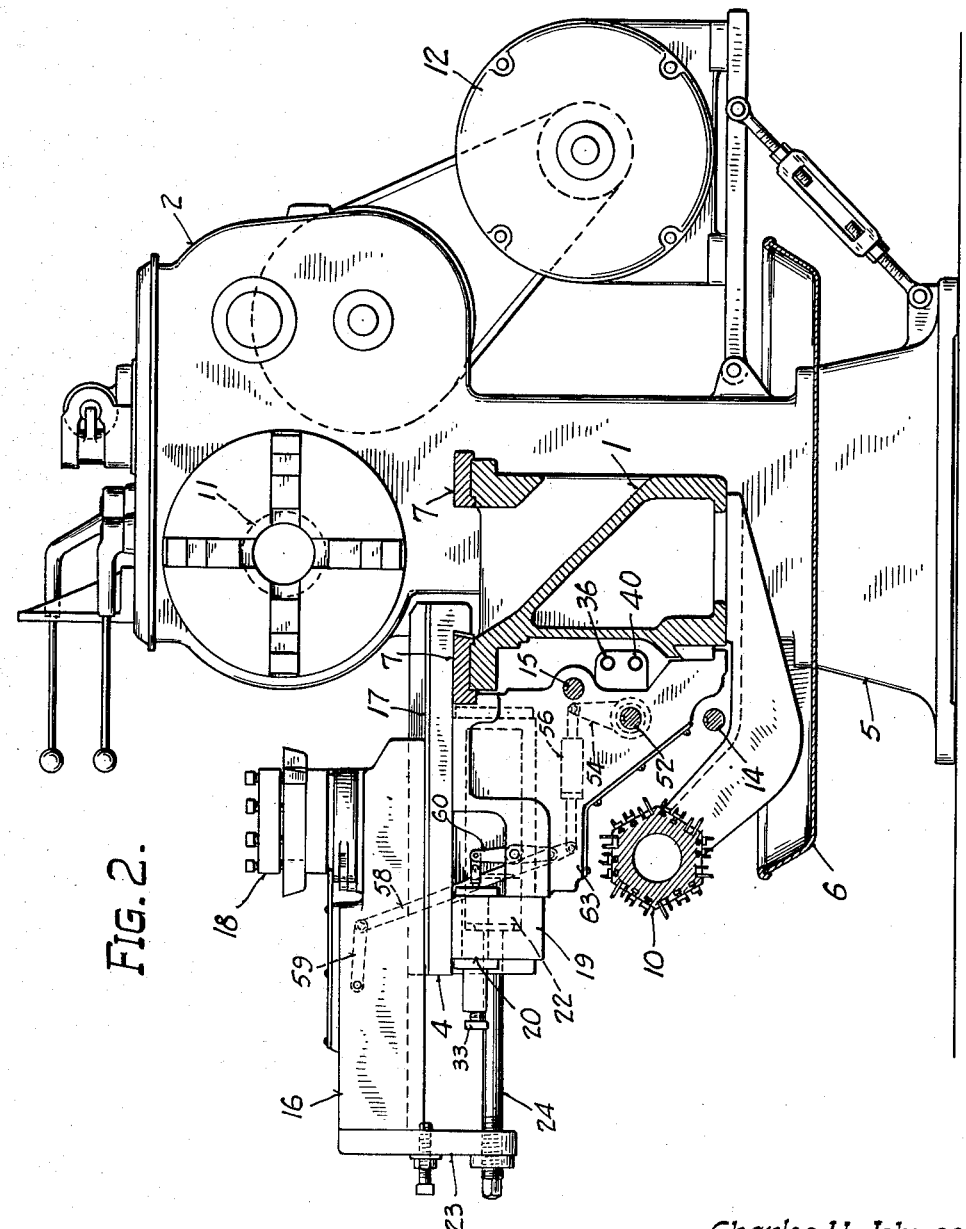
Fig. 2 is an enlarged transverse section taken on line 2—2 of Fig. 1 showing the tool slide and carriage in elevation.

The lathe illustrated comprises, in general, a bed 1, a headstock 2 at one end of the bed, a turret carriage 3 mounted for longitudinal movement along the bed at the end opposite the headstock, and a tool carriage 4 mounted for longitudinal movement on the bed between the turret carriage and headstock.

The bed 1 is supported from the floor by suitable legs 5 and has a pan 6 for coolant fluid and chips, encircling the same. Ways 7 are provided on the bed 1 for receiving carriages 3 and 4 and supporting the same for movement. A housing 8 is supported by the bed 1 at its rear end for containing the automatic index mechanism for the turret 9 and control drum 10.

The headstock 2 contains the drive for the work spindle 11 mounted therein, including suitable gear change mechanism and clutches therefor to provide the required range of spindle speeds in forward and reverse. The headstock 2 is driven by motor 12 mounted on the bed 1.

A variable displacement hydraulic pump 13 also driven by motor 12 supplies suitable hydraulic power for the lathe. A traverse shaft 14 extends rearwardly from the headstock 2 along the front of the lathe and is driven by the motor 12 to provide traverse movement for carriage 3 when desired. Similarly, a feed shaft 15 extends rearwardly from the headstock 2 along the front of the lathe and is driven by the headstock in correlation to the spindle speed to provide a feed drive for the turret carriage 3.

The turret carriage 3 has turret 9 mounted thereon and adapted to be indexed to successive operative positions by the automatic indexing mechanism contained in housing 8, and which is more specifically set forth and claimed in the copending applications of Louis Godfriaux, Serial No. 597,268, filed June 2, 1945, now Patent No. 2,565,305, granted August 21, 1951, for Automatic Turret Lathe, and Serial No. 758,500, filed July 2, 1947, for Automatic Turret Indexing Mechanism for Lathes, and assigned to the assignee of the present application.

The traverse and feed movements of turret carriage 3 are automatically controlled for each indexed position of the turret 9 by means of the cam control drum 10 secured to the front of the bed adjacent the path of movement of carriage 3, and which has a separate set of longitudinally positioned cams and trips for each turret position, adapted to engage corresponding control members on carriage 3 to operate the latter.

The drum 10 has the same number of operative positions as turret 9 and is indexed automatically and simultaneously with the indexing of the turret by the mechanism in housing 8 referred to above.

The tool carriage 4 may be moved or adjusted longitudinally by suitable hydraulic power as described in the application first referred to above.

A cross slide 16 is mounted on ways 17 on carriage 4 and carries a tool post 18 mounted thereon. The tool post 18 is preferably automatically indexed to different operative positions by movement of the slide 16 through its cycle, as set forth in the co-pending and now abandoned application of Louis Godfriaux, Serial No. 615,807, filed September 12, 1945, for Tool Post Index Mechanism for Lathes, and assigned to the assignee of the present invention.

The traverse and feed movements of the cross slide, to which the present invention particularly relates, are accomplished by a servo-motor construction utilizing a power cylinder 19, a control valve 20, both mounted on carriage 4, and a separate cam 21 secured to each of a plurality of the operative faces of drum 10.

The power cylinder 19 is disposed beneath slide 16 and extends axially parallel to the direction of movement of the slide. The piston 22 in cylinder 19 is connected to a depending bracket 23 on the front of the slide 16 by a piston rod 24 extending through the forward end of the cylinder.

Movement of slide 16 is effected in either direction by the supply and exhaust of pressure fluid at the corresponding opposite ends of the cylinder 19. The rate of movement or speed of slide 16 is dependent upon the differential supply and pressure of the fluid on opposite sides of piston 22, which is controlled by valve 20 in response primarily to cam 21 opposing a spring biasing means and secondarily to the movement of slide 16.

The valve 20 is cylindrical with end heads 25 and 26, and is mounted adjacent one side of cylinder 19 on carriage 4. The valve 20 has a reciprocal plunger 27 therein operated by a pull rod 28 extending through the rear end head 25 of the valve in opposition to a strong coil spring 29 disposed in a central tubular extension of the forward end head 26.

A washer 30 secured between head 26 and the valve body supports the inner end of spring 29 in fixed position while the outer end of the spring presses against a flange 31 on an axial extension 32 of the plunger 27.

An adjustable stop 33 is threaded into the outer end of the head 26 and is adapted to abut the end of extension 32 to modify movement of plunger 27 and provide an auxiliary manual control of the plunger.

The valve 20 contains five ports substantially equally spaced longitudinally thereof. The central port 34 constitutes the pressure intake receiving pressure fluid through conduit 35 which is connected by tube 36 to pump 13. The two end ports 37 and 38 constitute exhaust ports discharging through conduit 39 and tube 40 to a sump 41 from which pump 13 receives its supply of fluid. The two intermediate ports 42 and 43 are connected by conduits 44 and 45, respectively to the opposite ends of cylinder 19, rear port 42 being connected to the rear end of cylinder 19 and the front port 43 being connected to the forward end of cylinder 19.

The plunger 27 has three operative pistons which, in the neutral position of the plunger, substantially close off the corresponding ports 34, 37 and 38. Central piston 46 on plunger 27 is of approximately the same width as central port 34 and registers therewith to substantially close the port when in neutral position. Rear piston 47 on plunger 27 is preferably substantially wider than port 37 and is spaced from piston 46 approximately the distance between ports 34 and 37 to substantially close the latter when in neutral position. Likewise front piston 48 on plunger 27 is preferably substantially wider than port 38 and is spaced from piston 46 approximately the distance between ports 34 and 38 to substantially close the latter when in neutral position.

In operation, when plunger 27 is pulled rearwardly (to the right in the drawings) from neutral position by rod 28 against spring 29, port 34 is uncovered on the front side of piston 46 to connect with port 43 and supply power fluid from pump 13 through conduit 35, port 34, port 43 and conduit 45 to the forward end of cylinder 19, thereby moving the cross slide 16 inwardly for cutting operations. At the same time rear port 37 is uncovered by piston 47 and allows fluid from the rear end of cylinder 19 to exhaust through conduit 44, port 42, port 37, and conduit 39 to sump 41.

Likewise, when plunger 27 is moved forwardly (to the left in the drawings) from neutral position by spring 29, port 34 is uncovered on the rear side of piston 46 to connect with port 42 and supply power fluid from pump 13 through conduit 35, port 34, port 42 and conduit 44 to the rear end of cylinder 19, thereby moving the cross slide 16 outwardly and retracting the same from cutting operations. At the same time front port 38 is uncovered by piston 48 and allows fluid from the forward end of cylinder 19 to exhaust through conduit 45, port 43, port 38 and conduit 39 to sump 41.

The operation of plunger 27 by rod 28 and spring 29 is controlled by linkage and levers in response to cam 21 and to the movement of slide 16.

For this purpose the turret carriage 3 has a lever 49 fulcrumed at its center and carrying a floating cam rider 50 at its forward end for engagement with the operative cam 21 as the carriage 3 moves along the bed 1. The rear end of lever 49 is linked to a crank 51 keyed on rock shaft 52 which extends forwardly to pass through a suitable bearing 53 in tool carriage 4.

A crank 54 has a sliding key 55 splining it to rock shaft 52 and is held by the bearing 53 to allow the shaft to reciprocate axially therethrough as the turret carriage 3 is reciprocated.

The crank 54 extends substantially vertical from shaft 52 and is pivoted to a horizontal control rod 56 of adjustable length. The control rod 56 in turn is pivoted at 57 to the lower end of a long lever 58 extending upwardly to slide 16 to which it is connected by link 59.

The lever 58 is pivoted near pivot 57 to the lower end of a vertical lever 60 fulcrumed at its center on carriage 4 and connected at its upper end by link 61 to rod 28 of plunger 27.

The control rod 56 has telescopic members biased outwardly by an intermediate spring 62 which provides for an automatic shortening of the rod, as a safety release, in case the crank 54 pushes rod 56 faster than the slide 16 can move inwardly in feeding operations.

Figure 3:
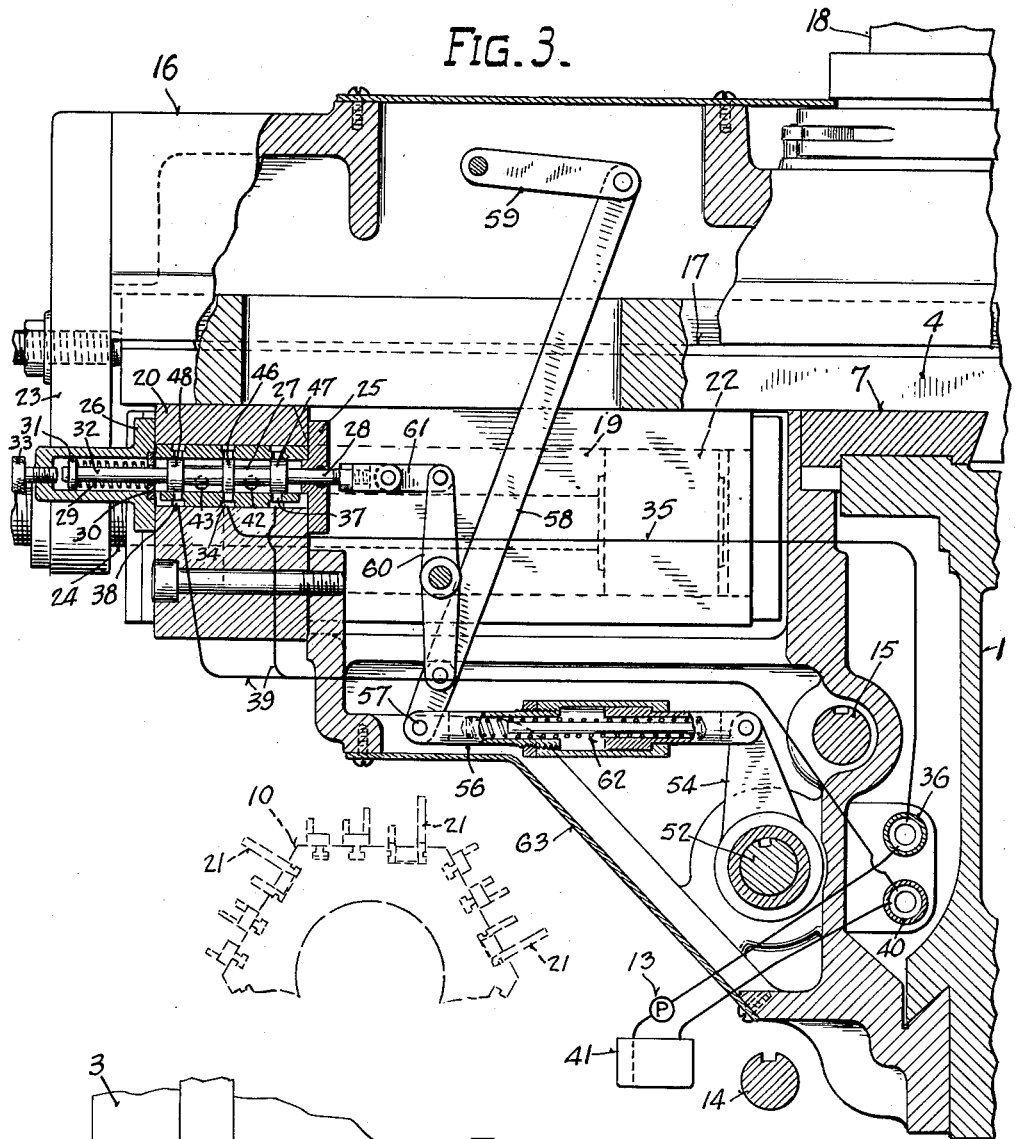
Fig. 3 is a detail enlarged section similar to part of Fig. 2 with parts of the power cylinder and valve centrally sectioned and showing the cross slide in substantially its innermost position.
Figure 4:
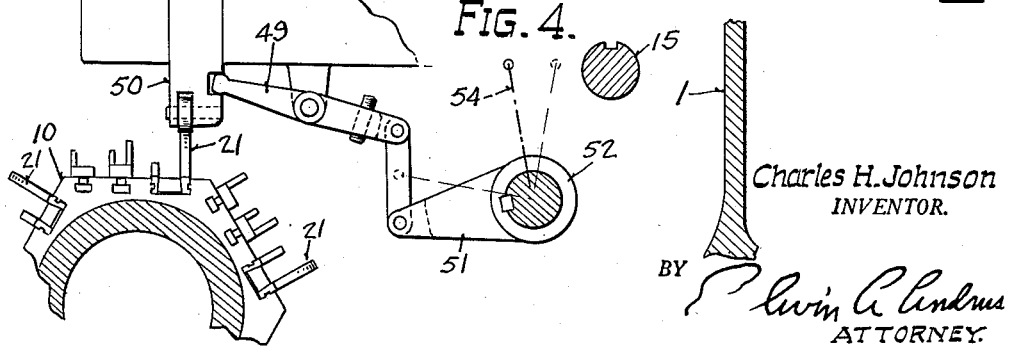
Fig. 4 is a detail schematic section showing the cam and lever linkage for operating the rock shaft.
Figure 5:
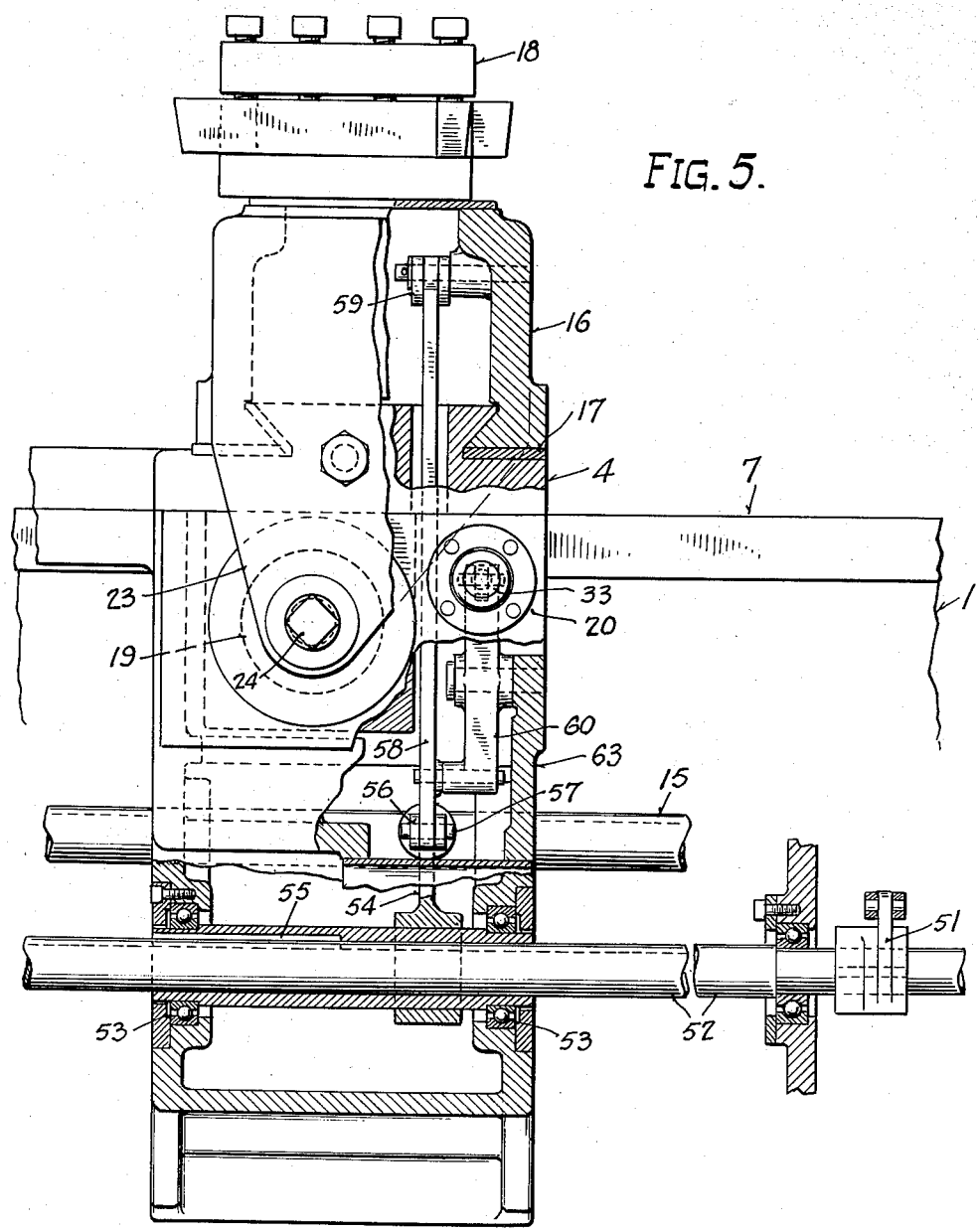
Fig. 5 is a front elevation of the tool carriage with parts broken away and sectioned.
Figure 6:
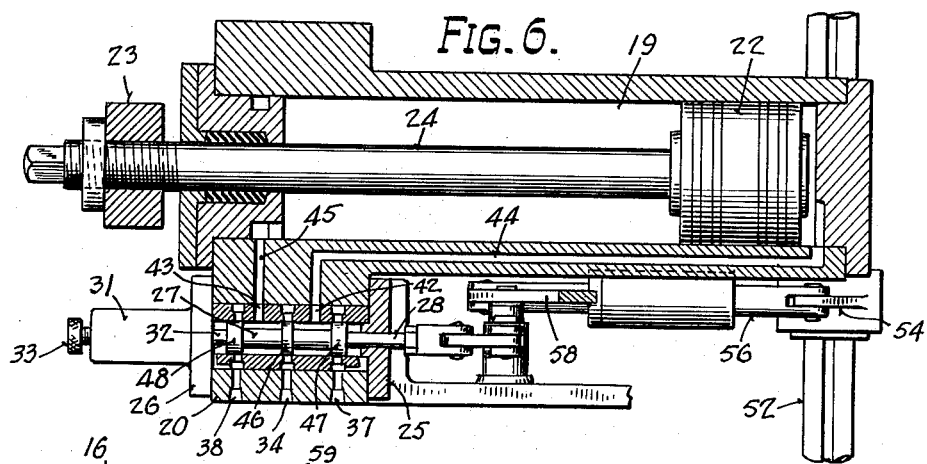
Fig. 6 is a horizontal axial section through the power cylinder and control valve showing the connections therebetween.

In operation, as the carriage 3 moves forward, cam follower 50 engages cam 21 on drum 10 and is raised thereby, rocking shaft 52 to the left, counter clockwise in Fig. 3, and pushing control rod 56 to the left. As a result the pull rod 28 moves plunger 27 rearwardly to thereby operate piston 22 in cylinder 19 and move slide 16 inwardly toward the work.

As the slide 16 moves inwardly the upper end of lever 58 moves a corresponding amount to the right, thereby pivoting lever 58 on pivot 57 as a fulcrum and allowing spring 29 to bias plunger 27 forwardly to neutral position where valve 20 is closed or balanced and stops further movement of slide 16.

When carriage 3 returns, follower 50 rides down cam 21 and finally drops off the cam, thereby allowing spring 29 to push plunger 27 forwardly to the left in Fig. 3, causing lever 60 to push the lower end of lever 58, and control rod 56 to the right. Rock shaft 52 is turned to the right, clockwise, causing lever 49 to lower cam rider 50 to a position where it is ready to engage the next cam 21 upon the next trip forward of carriage 3.

Movement of plunger 27 forwardly to the left by spring 29, as described, effects an outward movement of cross slide 16 until the latter engages a suitable stop or until the piston 22 reaches the limit of its outward movement in cylinder 19. As the slide moves outwardly the upper end of lever 58 moves a corresponding amount to the left, thereby tending to pivot lever 58 on pivot 57 as a fulcrum and to thereby gradually move plunger 27 against spring 29 to neutral position. However, since pivot 57 is not held as a fixed fulcrum at this time and is free to move, the plunger 27 does not reach neutral, but remains to the left to retain valve 20 open and thereby hold the slide 16 in its outermost position until the next feeding cycle.

When the cycle of slide movement is repeated by the next forward movement of carriage 3, follower 50 engages the succeeding cam 21 and is lifted upwardly to push control rod 56 to the left thereby moving plunger 27 to the right past neutral position and starting the inward traverse and feed movements of the slide.

When rider 50 is disengaged from cam 21 and fulcrum pivot 57 is floating, it is sometimes desirable to manually control the movement of the slide. This can be done by threading stop 33 in or out to move plunger 27 against its spring 29.

Figure 7:
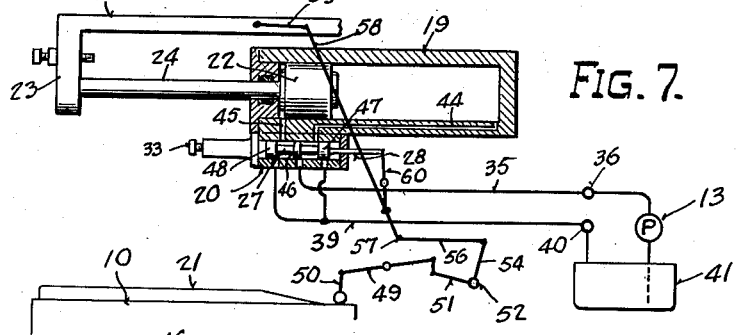
Fig. 7 is a schematic diagrammatic illustration of the hydraulic circuit and lever mechanism when the tool slide is in retracted position.
Figure 8:
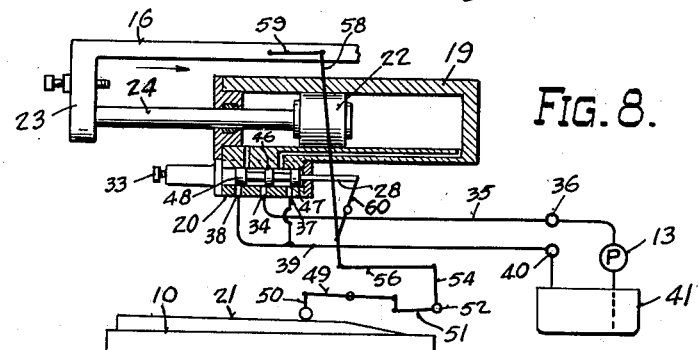
Fig. 8 is a view similar to Fig. 7 showing the tool slide in forward traverse movement.
Figure 9:
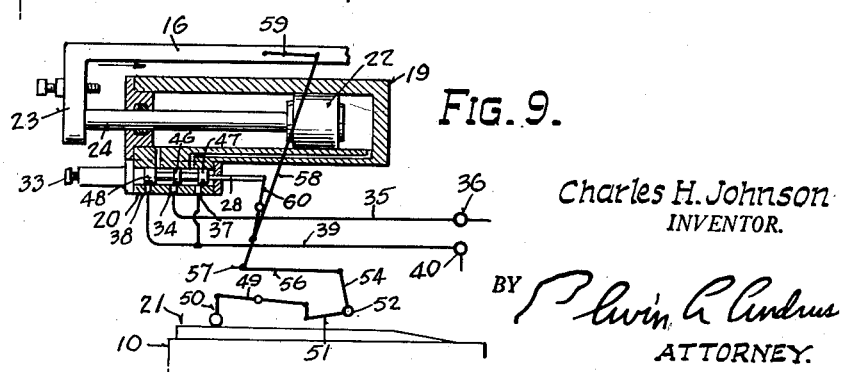
Fig. 9 is a view similar to Fig. 7 showing the tool slide approaching the end of its forward feed.

The several movements are illustrated in Figures 7, 8, and 9 in which: Fig. 7 depicts the parts with the follower 50 disengaged from cam 21 and with the slide 16 in its outermost position in readiness for the next inward movement; Fig. 8 depicts the parts with the follower 50 about half way up on cam 21 and with the slide 16 traversing inwardly to feeding position; and Fig. 9 depicts the parts with the follower 50 riding on the feeding section of cam 21 and with the slide 16 slowly moving inward to feed the tool to the work.

The provision of spring 62 in rod 56 enables the cam 21 to provide a relatively sharp lift of follower 50 without regard to the actual feed of the slide, the latter being at the fastest speed possible for the available volume of fluid per minute supplied to cylinder 19.

The lever mechanism for operating valve 20 provides for a wide range of movement of the slide 16 for a relatively short movement of cam rider 50 and allows the latter to lift away from the cam on the return stroke without opposing the traverse of the slide in retracting the tool. Only a short vertical movement of cam follower 50 is required to operate valve 20 and effect movement of the slide 16.

The lever 58 provides a leverage ratio of about ten to one for the slide 16 in moving the plunger 27 against spring 29 when the slide is retracting the tool and in holding the upper end of the lever against movement of the plunger 27 by the spring 29 when the slide is feeding the tool. The arrangement of the levers is such as to require very little of the power of cylinder 19 to correct the position of plunger 27 during feeding and traverse of the tool, thereby keeping the power for moving the tool in cutting substantially constant.

The arrangement of the servo-valve to provide that the spring 29 pushes the plunger 27 in a direction effecting a retraction of the slide 16 establishes a lock for holding the slide in its outermost retracted position in which the valve 20 remains open sufficiently to supply fluid pressure constantly on the right side of piston 22.

Figure 10:
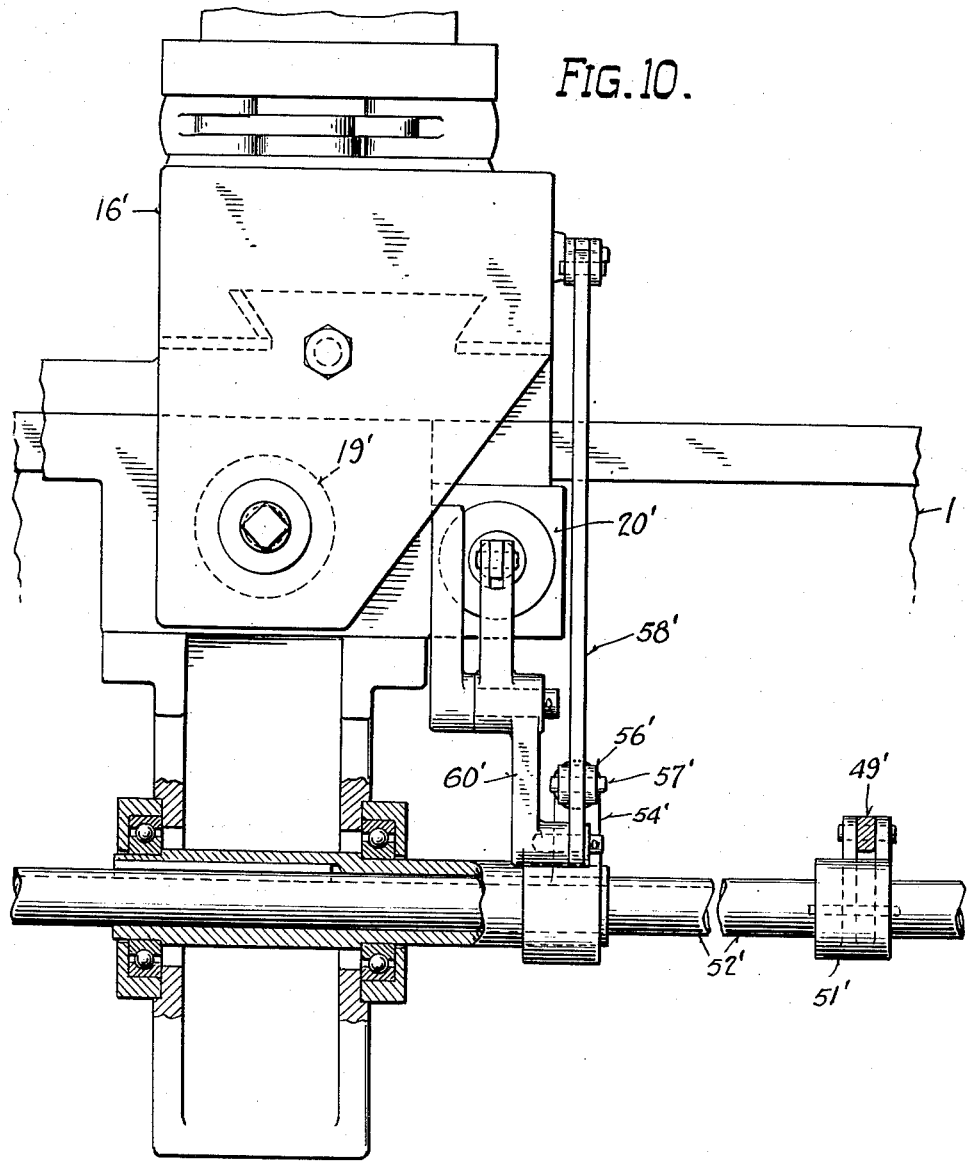
Fig. 10 is a front elevation showing a construction in which the control valve is mounted behind the operating levers.
Figure 11:
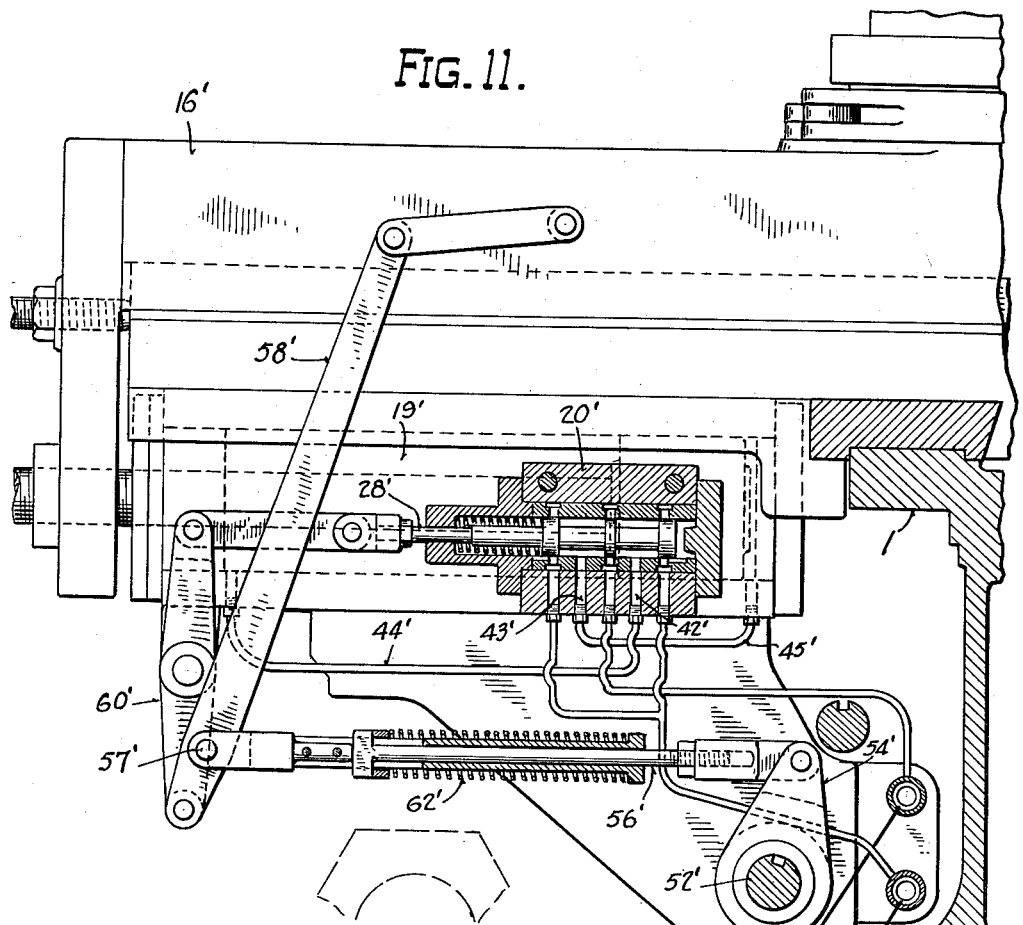
Fig. 11 is a side elevation of the construction of Fig. 10 showing parts in section.
Figure 12:
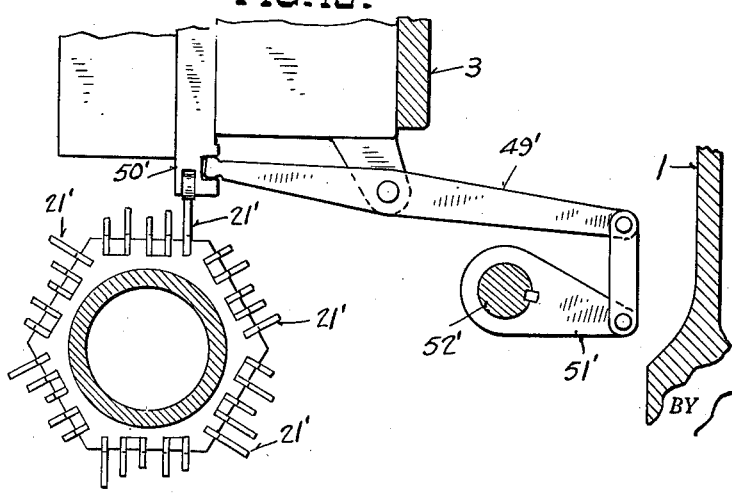
Fig. 12 is a view similar to Fig. 4 showing the cam and lever construction for operating the rock shaft for Figs. 10 and 11.

The same advantages may be obtained by mounting the valve 20 in different positions. Figs. 10, 11 and 12 show a construction in which the valve 20' is turned around from its position in Figs. 1 to 9, and in which the rock shaft 52' turns in the opposite direction from rock shaft 52 in operating the valve.

In Figs. 10, 11 and 12, the lever 49' is longer and is connected to crank 51' on the rear side of shaft 52' instead of on the forward side, so that raising of follower 50' by cam 21' serves to turn shaft 52' clockwise instead of counter-clockwise.

When rock shaft 52' is turned by cam 21 it pulls control rod 56' to the right and pulls rod 28' forwardly in valve 20' to effect the inward feed of slide 16'.

The control rod 56' is extensible by reason of the spring 62' biasing telescoping members of the rod in a direction tending to contract the rod.

The pivot 57' is connected to lever 58' above the lower end of the latter, while lever 60' has its lower end pivoted to the lower end of lever 58'.

The valve 20' and plunger 27' are constructed the same as in the described embodiment, with the exception that rear port 42' is connected by conduit 44' to the forward end of cylinder 19' while the front port 43' is connected by conduit 45' to the rear end of cylinder 19'.

The fundamental operation of the construction of Figs. 11 and 12 is the same as that of the construction previously described. The construction of Figs. 1 to 10 is preferred since the lever mechanism is disposed behind the valve and can be more readily enclosed and kept free from accidental injury or from interference by a casing 63.

The invention may have various embodiments within the scope of the accompanying claims.

I claim:

1. In a lathe having a bed, a rotary spindle disposed to rotate a workpiece, a tool carriage movable on the bed and a tool slide on the carriage for moving a tool toward and away from the work, a servo-motor feed for said slide operable in correlation to the rotational speed of said spindle and comprising a source of power fluid, a reversible hydraulic motor disposed to move the cross slide on the tool carriage to effect feed and traverse movements for the tool, a control valve mounted on the carriage and connected with said power source and motor to supply power fluid to the latter for operating the same, a longitudinally movable plunger in said valve governing the ports thereof to control the direction and amount of fluid feed to said motor and having a central neutral position substantially balancing the fluid pressure applied to operate the motor in opposite directions to thereby hold the motor stationary when the plunger is in neutral position, spring means biasing said plunger in a longitudinal direction away from neutral which effects outward movement of the slide by said motor, a follow-up lever mechanism fulcrumed on the carriage and connected to said slide and plunger to effect movement of the latter toward neutral position when said slide is moved by said motor in either direction, the movement of the plunger being proportional to the corresponding movement of the slide in each instance, and a cam control on said bed operated in correlation to the spindle speed and connected to the follow-up lever mechanism to displace the plunger in opposition to said spring means and effect inward movement of the slide by said motor.

2. In a lathe having a bed, a rotary spindle disposed to rotate a workpiece, a tool carriage movable on the bed and a tool slide on the carriage for moving a tool toward and away from the work, a servo-motor feed for said slide operable in correlation to the rotational speed of said spindle and comprising a source of power fluid, a reversible hydraulic motor disposed to move the cross slide on the tool carriage to effect feed and traverse movements for the tool, a control valve mounted on the carriage and connected with said power source and motor to supply power fluid to the latter for operating the same, a longitudinally movable plunger in said valve governing the ports thereof to control the direction and amount of fluid feed to said motor and having a central neutral position substantially balancing the fluid pressure applied to operate the motor in opposite directions to thereby hold the motor stationary when the plunger is in neutral position, spring means biasing said plunger in a longitudinal direction away from neutral which effects outward movement of the slide by said motor, a follow-up lever mechanism fulcrumed on the carriage and connected to said slide and plunger to effect movement of the latter toward neutral position when said slide is moved by said motor in either direction, the movement of the plunger being proportional to the corresponding movement of the slide in each instance, a cam control on said bed operated in correlation to the spindle speed and connected to the follow-up lever mechanism to displace the plunger in opposition to said spring means and effect inward movement of the slide by said motor, and means to disengage said cam control in the outermost position for said slide to effect holding of the slide outwardly by said motor under the sole control of said spring means.

3. In a lathe having a bed, a rotary spindle disposed to rotate a workpiece, a tool carriage movable on the bed and a tool slide on the carriage for moving a tool toward and away from the work, a servo-motor feed for said slide operable in correlation to the rotational speed of said spindle and comprising a source of power fluid, a reversible hydraulic motor disposed to move the cross slide on the tool carriage to effect feed and traverse movements for the tool, a control valve mounted on the carriage and connected with said power source and motor to supply power fluid to the latter for operating the same, a longitudinally movable plunger in said valve governing the ports thereof to control the direction and amount of fluid feed to said motor and having a central neutral position substantially balancing the fluid pressure applied to operate the motor in opposite directions to thereby hold the motor stationary when the plunger is in neutral position, spring means biasing said plunger in a longitudinal direction away from neutral which effects outward movement of the slide by said motor, a follow-up lever mechanism fulcrumed on the carriage and connected to said slide and plunger to effect movement of the latter toward neutral position when said slide is moved by said motor in either direction, the movement of the plunger being proportional to the corresponding movement of the slide in each instance, a cam control on said bed operated in correlation to the spindle speed and connected to the follow-up lever mechanism to displace the plunger in opposition to said spring means and effect inward movement of the slide by said motor, and spring cushion means interposed between said cam control and said lever mechanism to provide a safety time lag in the operation of said lever mechanism by said cam control.

4. In a lathe having a bed, a rotary spindle disposed to rotate a workpiece, a tool carriage movable on the bed and a tool slide on the carriage for moving a tool toward and away from the work, a servo-motor feed for said slide operable in correlation to the rotational speed of said spindle and comprising a source of power fluid, a reversible hydraulic motor disposed to move the cross slide on the tool carriage to effect feed and traverse movements for the tool, a control valve mounted on the carriage and connected with said power source and motor to supply power fluid to the latter for operating the same, a longitudinally movable plunger in said valve governing the ports thereof to control the direction and amount of fluid feed to said motor and having a central neutral position substantially balancing the fluid pressure applied to operate the motor in opposite directions to thereby hold the motor stationary when the plunger is in neutral position, spring means biasing said plunger in a longitudinal direction away from neutral which effects outward movement of the slide by said motor, a lever disposed substantially at right angles to said plunger and fulcrumed on the carriage and connected at one end to said plunger to operate the same in opposition to said spring means, an arm pivotally connected to the opposite end of said lever and linked to said slide at a substantial distance from said pivotal connection, said arm extending in the general direction of said lever, an operating rod pivoted to said arm near said pivotal connection with the lever and disposed substantially at right angles to said lever to effect operation of the latter by longitudinal movement of said rod, and cam means operable in correlation to the spindle speed and connected with said rod to operate the latter.

5. In a lathe having a bed, a rotary spindle disposed to rotate a workpiece, a tool carriage movable on the bed and a tool slide on the carriage for moving a tool toward and away from the work, a servo-motor feed for said slide operable in correlation to the rotational speed of said spindle and comprising a source of power fluid, a reversible hydraulic motor disposed to move the cross slide on the tool carriage to effect feed and traverse movements for the tool, a control valve mounted on the carriage and connected with said power source and motor to supply power fluid to the latter for operating the same, a longitudinally movable plunger in said valve governing the ports thereof to control the direction and amount of fluid feed to said motor and having a central neutral position substantially balancing the fluid pressure applied to operate the motor in opposite directions to thereby hold the motor stationary when the plunger is in neutral position, spring means biasing said plunger in a longitudinal direction away from neutral which effects outward movement of the slide by said motor, a lever disposed substantially at right angles to said plunger and fulcrumed on the carriage and connected at one end to the inner end of said plunger to operate the same in opposition to said spring means, an arm pivotally connected to the opposite end of said lever and linked to said slide at a substantial distance from said pivotal connection, said arm extending in the general direction of said lever, an operating push rod pivoted to said arm near said pivotal connection with the lever and disposed substantially at right angles to said lever and in a direction from said pivotal connection in which it opposes the movement of said lever effective by said spring means, and cam means operable in correlation to the spindle speed and connected to said push rod to operate the latter.

6. In a lathe having a bed, a rotary spindle disposed to rotate a workpiece, a tool carriage movable on the bed and a tool slide on the carriage for moving a tool toward and away from the work, a servo-motor feed for said slide operable in correlation to the rotational speed of said spindle and comprising a source of power fluid, a reversible hydraulic motor disposed to move the cross slide on the tool carriage to effect feed and traverse movements for the tool, a control valve mounted on the carriage and connected with said power source and motor to supply power fluid to the latter for operating the same, a longitudinally movable plunger in said valve governing the ports thereof to control the direction and amount of fluid feed to said motor and having a central neutral position substantially balancing the fluid pressure applied to operate the motor in opposite directions to thereby hold the motor stationary when the plunger is in neutral position, spring means biasing said plunger in a longitudinal direction away from neutral which effects outward movement of the slide by said motor, a lever disposed substantially at right angles to said plunger and fulcrumed on the carriage and connected at one end to the inner end of said plunger to operate the same in opposition to said spring means, an arm pivotally connected to the opposite end of said lever and linked to said slide at a substantial distance from said pivotal connection, said arm extending in the general direction of said lever, an operating push rod pivoted to said arm near said pivotal connection with the lever and disposed substantially at right angles to said lever and in a direction from said pivotal connection in which it opposes the movement of said lever effective by said spring means, cam means operable in correlation to the spindle speed and connected to said push rod to operate the latter, and cushion means in said push rod disposed to provide for the emergency contraction thereof in length between the actuating connection of said cam means thereto and the pivotal connection thereof to said arm.

7. In a lathe having a bed, a rotary spindle disposed to rotate a workpiece, a tool carriage movable on the bed and a tool slide on the carriage for moving a tool toward and away from the work, a servo-motor feed for said slide operable in correlation to the rotational speed of said spindle and comprising a source of power fluid, a reversible hydraulic motor disposed to move the cross slide on the tool carriage to effect feed and traverse movements for the tool, a control valve mounted on the carriage and connected with said power source and motor to supply power fluid to the latter for operating the same, a longitudinally movable plunger in said valve governing the ports thereof to control the direction and amount of fluid feed to said motor and having a central neutral position substantially balancing the fluid pressure applied to operate the motor in opposite directions to thereby hold the motor stationary when the plunger is in neutral position, spring means biasing said plunger in a longitudinal direction away from neutral which effects outward movement of the slide by said motor, a lever disposed substantially at right angles to said plunger and fulcrumed on the carriage and connected at one end to the outer end of said plunger to operate the same in opposition to said spring means, an arm pivotally connected to the opposite end of said lever and linked to said slide at a substantial distance from said pivotal connection, said arm extending in the general direction of said lever, an operating pull rod pivoted to said arm near said pivotal connection with the lever and disposed substantially at right angles to said lever and in a direction from said pivotal connection in which it opposes the movement of said lever effective by said spring means, and cam means operable in correlation to the spindle speed and connected to said pull rod to operate the latter.

8. In a lathe having a bed, a rotary spindle disposed to rotate a workpiece, a tool carriage movable on the bed and a tool slide on the carriage for moving a tool toward and away from the work, a servo-motor feed for said slide operable in correlation to the rotational speed of said spindle and comprising a source of power fluid, a reversible hydraulic motor disposed to move the cross slide on the tool carriage to effect feed and traverse movements for the tool, a control valve mounted on the carriage and connected with said power source and motor to supply power fluid to the latter for operating the same, a longitudinally movable plunger in said valve governing the ports thereof to control the direction and amount of fluid feed to said motor and having a central neutral position substantially balancing the fluid pressure applied to operate the motor in opposite directions to thereby hold the motor stationary when the plunger is in neutral position, spring means biasing said plunger in a longitudinal direction away from neutral which effects outward movement of the slide by said motor, a lever disposed substantially at right angles to said plunger and fulcrumed on the carriage and connected at one end to the outer end of said plunger to operate the same in opposition to said spring means, an arm pivotally connected to the opposite end of said lever and linked to said slide at a substantial distance from said pivotal connection, said arm extending in the general direction of said lever, an operating pull rod pivoted to said arm near said pivotal connection with the lever and disposed substantially at right angles to said lever and in a direction from said pivotal connection in which it opposes the movement of said lever effective by said spring means, cam means operable in correlation to the spindle speed and connected to said pull rod to operate the latter, and cushion means in said pull rod disposed to provide for the emergency lengthening thereof between the actuating connection of said cam means thereto and the pivotal connection thereof to said arm.

9. In a lathe having a bed, a rotary spindle disposed to rotate a workpiece, a tool carriage movable on the bed and a tool slide on the carriage for moving a tool toward and away from the work; a servo-motor feed for said slide operable in correlation to the rotational speed of said spindle and comprising a source of power fluid, a reversible hydraulic motor disposed to move the cross slide on the tool carriage to effect feed and traverse movements for the tool, a control valve mounted on the carriage and connected with said power source and motor to supply power fluid to the latter for operating the same, a longitudinally movable plunger in said valve governing the ports thereof to control the direction and amount of fluid feed to said motor and having a central neutral position substantially balancing the fluid pressure applied to operate the motor in opposite directions to thereby hold the motor stationary when the plunger is in neutral position, spring means biasing said plunger in a longitudinal direction away from neutral which effects outward movement of the slide by said motor, a follow-up lever mechanism fulcrumed on the carriage and connected to said slide and plunger to effect movement of the latter toward neutral position when said slide is moved by said motor in either direction, the movement of the plunger being proportional to the corresponding movement of the slide in each instance, a cam control on said bed operated in correlation to the spindle speed and connected to the follow-up lever mechanism to displace the plunger in opposition to said spring means and effect inward movement of the slide by said motor, and manual means disposed to operate said plunger in the direction of operation thereof by said cam to provide for setting up of the tool.

10. In a lathe having a bed, a rotary spindle disposed to rotate a workpiece, a tool carriage movable on the bed and a tool slide on the carriage for moving a tool toward and away from the work, a servo-motor feed for said slide operable in correlation to the rotational speed of said spindle and comprising a source of power fluid, a reversible hydraulic motor disposed to move the cross slide on the tool carriage to effect feed and traverse movements for the tool, a control valve mounted on the carriage and connected with said power source and motor to supply power fluid to the latter for operating the same, a longitudinally movable plunger in said valve governing the ports thereof to control the direction and amount of fluid feed to said motor and having a central neutral position substantially balancing the fluid pressure applied to operate the motor in opposite directions to thereby hold the motor stationary when the plunger is in neutral position, spring means biasing said plunger in a longitudinal direction away from neutral which effects outward movement of the slide by said motor, a follow-up lever mechanism fulcrumed on the carriage and connected to said slide and plunger to effect movement of the latter toward neutral position when said slide is moved by said motor in either direction, the movement of the plunger being proportional to the corresponding movement of the slide in each instance, a cam control on said bed operated in correlation to the spindle speed and connected to the follow-up lever mechanism to displace the plunger in opposition to said spring means and effect inward movement of the slide by said motor, means to disengage said cam control in the outermost position for said slide to effect holding of the slide outwardly by said motor under the sole control of said spring means, and manual means disposed to operate said plunger in the direction of operation thereof by said cam when the latter is disengaged.

CHARLES H. JOHNSON.

REFERENCES CITED

The following references are of record in the file of this patent:

UNITED STATES PATENTS

| Number | Name | Date |
|---|---|---|
| 949,559 | Wilson | Feb. 15, 1910 |
| 1,124,998 | Brown | Jan. 19, 1915 |
| 1,230,049 | Stafford | June 12, 1917 |
| 1,231,257 | Herr | June 26, 1917 |
| 1,816,787 | Moss | July 28, 1931 |
| 2,047,181 | Ferris | July 14, 1936 |
| 2,055,530 | Hallenbeck | Sept. 29, 1936 |
| 2,375,831 | Turchan et al. | May 15, 1945 |